(12) United States Patent
Bank et al.

(10) Patent No.: US 9,081,735 B2
(45) Date of Patent: Jul. 14, 2015

(54) COLLABORATIVE INFORMATION SOURCE RECOVERY

(75) Inventors: Judith H. Bank, Morrisville, NC (US); Lisa M. Bradley, Cary, NC (US); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/026,235

(22) Filed: Feb. 12, 2011

(65) Prior Publication Data

US 2012/0209816 A1 Aug. 16, 2012

(51) Int. Cl.
*G06F 11/14* (2006.01)

(52) U.S. Cl.
CPC ........ *G06F 11/1492* (2013.01); *G06F 11/1469* (2013.01)

(58) Field of Classification Search
CPC . H04L 67/104; G06F 3/067; G06F 17/30575; G06F 11/0751; G06F 11/1446; G06F 11/1471; G06F 11/1469; G06F 11/2094
See application file for complete search history.

(56) References Cited

U.S. PATENT DOCUMENTS

| | | | |
|---|---|---|---|
| 5,412,801 A | 5/1995 | de Remer et al. | |
| 6,826,707 B1 | 11/2004 | Stevens | |
| 6,883,110 B1 | 4/2005 | Goddard | |
| 7,065,674 B2* | 6/2006 | Cabrera et al. | 714/16 |
| 7,487,112 B2* | 2/2009 | Barnes, Jr. | 705/26.8 |
| 7,769,366 B2* | 8/2010 | Celik | 455/415 |
| 2002/0143905 A1* | 10/2002 | Govindarajan et al. | 709/220 |
| 2005/0251540 A1 | 11/2005 | Sim-Tang | |
| 2007/0168704 A1 | 7/2007 | Connolly et al. | |
| 2008/0162684 A1 | 7/2008 | Neyama et al. | |
| 2009/0187609 A1 | 7/2009 | Barton et al. | |
| 2010/0100587 A1 | 4/2010 | Teglovic et al. | |
| 2011/0145627 A1 | 6/2011 | Huras et al. | |
| 2011/0276633 A1* | 11/2011 | Marchisio et al. | 709/205 |

FOREIGN PATENT DOCUMENTS

| | | |
|---|---|---|
| CN | 101923573 A | 12/2010 |
| JP | 2008-033778 A | 2/2008 |

OTHER PUBLICATIONS

"Notification of Transmittal of the International Search Report and the Written Opinion of the International Searching Authority, or the Declaration" for PCT/CA2012/050073, mailed Jun. 6 2012, 12 pages, Canadian Intellectual Property Office.
Patents Act 1977: Examination Report under Section 18(3), Oct. 10, 2013, Intellectual Property Office, United Kingdom.

* cited by examiner

*Primary Examiner* — Sangwoo Ahn
(74) *Attorney, Agent, or Firm* — Jordan IP Law, LLC

(57) ABSTRACT

Systems and methods of recovering a shared information source can involve identifying a first user of a shared information source in response to detection of a data loss with respect to the shared information source. One or more additional users of the shared information source may be identified based on data associated with the first user. Additionally, the shared information source can be recovered based at least in part on data associated with the one or more additional users.

22 Claims, 1 Drawing Sheet

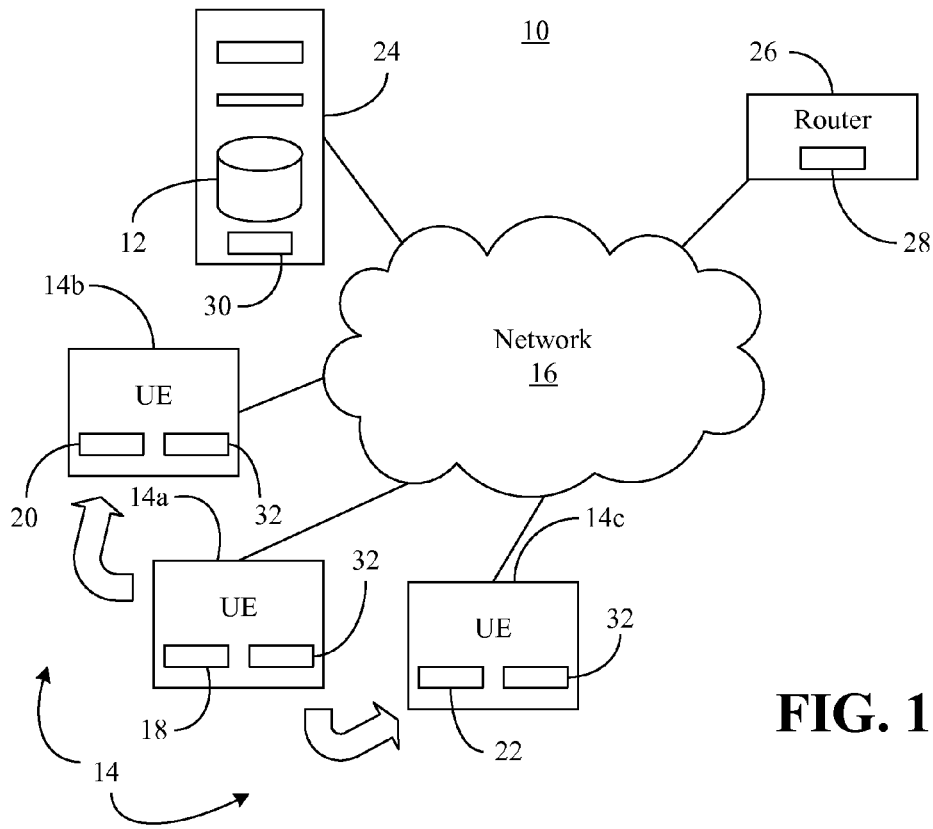
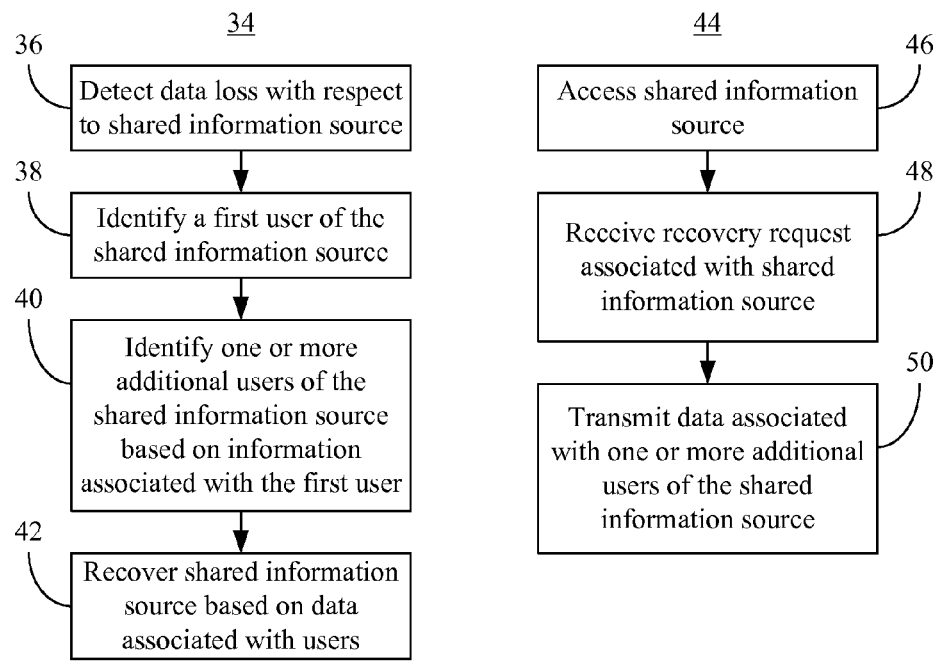
FIG. 1
FIG. 2
FIG. 3

COLLABORATIVE INFORMATION SOURCE RECOVERY

BACKGROUND

1. Technical Field

Embodiments of the present invention generally relate to information source recovery. More particularly, embodiments relate to the bootstrapping of user data to recover shared information sources.

2. Discussion

Conventional database systems may generate logs that contain information about updates and modifications to the database in question. While these logs might be used to restore the database in the event of a data corruption or outage, the ability to fully restore a database to its previous state may depend upon the availability and reliability of the logs. For example, a catastrophic system failure, disk failure, or pervasive human error could delete the logs and/or render them unusable.

BRIEF SUMMARY

Embodiments may provide for a computer implemented method in which a first user of a shared information source is identified in response to detection of a data loss with respect to the shared information source. One or more additional users of the shared information source can be identified based on data associated with the first user. The method may also provide for recovering the shared information source based at least in part on data associated with the one or more additional users.

Embodiments may also include a computer program product having a computer readable storage medium and computer usable code stored on the computer readable storage medium. If executed by a processor, the computer usable code causes a computer to identify a first user of a shared information source in response to detection of a data loss with respect to the shared information source. The computer usable code can also cause a computer to identify one or more additional users of the shared information source based on data associated with the first user, and recover the shared information source based at least in part on data associated with the one or more additional users.

Other embodiments can involve a computer implemented method in which a shared information source is accessed and a recovery request associated with the shared information source is received. The method may also provide for transmitting data associated with one or more additional users of the shared information source in response to the recovery request.

In addition, embodiments may include a computer program product having a computer readable storage medium and computer usable code stored on the computer readable storage medium, where, if executed by a processor, the computer usable code causes a computer to access a shared information source. The computer usable code can also cause a computer to receive a recovery request associated with the shared information source, and transmit data associated with one or more additional users of the shared information source in response to the recovery request.

Embodiments may also involve a computer implemented method in which a network component is queried in response to detection of a data loss with respect to a shared information source. An identifier of a first user of the shared information source can be received from the network component, wherein the identifier includes at least one of an Internet Protocol address, a login identifier, and an email address associated with the first user. The method can also provide for identifying one or more additional users of the shared information source based on data associated with the first user, and reconstructing the shared information source based at least in part on data associated with the one or more additional users. Additionally, a comparison may be conducted between the reconstructed shared information source and a previous shared information source, and generating a notification based on the comparison.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 1 is a block diagram of an example of a computing system architecture according to an embodiment;

FIG. 2 is a flowchart of an example of a method of recovering a shared information source according to an embodiment; and FIG. 3 is a flowchart of an example of a method of processing a recovery request according to an embodiment.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an architecture 10 is shown in which a shared information source 12 such as a shared database (e.g., relational database, email database, etc.) or web site may be recovered by bootstrapping together content from two or more users of the shared information source 12. In the illustrated example, user equipment (UE) 14 (14a-14c) can be used to access the shared information source 12 via a network 16, wherein accessing the shared information source 12 results in content 18, 20, 22 corresponding to the shared information source 12 being stored on the UE 14. The content 18, 20, 22 could constitute a portion (e.g., subset) or all (e.g., complete replica) of the shared information source 12, wherein the illustrated approach can provide for compiling the most recent versions of the content 18, 20, 22 to reconstruct the shared information source 12.

The UE 14 may be a personal computer (PC), notebook computer, personal digital assistant (PDA), wireless smartphone, or other device having access to a server 24 or other platform containing the shared information source 12, via the network 16. For example, if the shared information source 12 is an email database, the content 18, 20, 22 might include individual email messages either sent from or received by the users associated with the respective UE 14 over the network 16. If, on the other hand, the shared information source 12 is a web site, the content 18, 20, 22 could include cached page data from the web pages visited by the users associated with the respective UE 14 over the network 16.

As already noted, if a data loss (e.g., due to system failure, disk failure, human error) occurs with respect to the shared information source 12, the content 18, 20, 22 may be used to recover the shared information source 12. Moreover, if the data loss includes a loss of information regarding the UE 14 itself, a loss of the identities of the users associated with the respective UE 14, or if such identities and/or information is not retained (e.g., the source is an open database or open web server), the illustrated architecture 10 is able to locate the content 18, 20, 22 and recover the shared information source 12 based on the content 18, 20, 22. In particular, the network 16 can include components that are able to identify one or more users of the shared information source 12 and/or the UE 14 associated with such users. For example, the illustrated network 16 can include any suitable combination of servers, access points, routers such as router 26, base stations, mobile switching centers, public switching telephone network (PSTN) components, etc., to facilitate communication between the UE 14 and the server 24, wherein these network components may store information that is useful in the recovery process.

In one example, the router 26 is a network component that includes one or more identifiers 28 associated with at least one of the UE 14 devices, wherein the identifier 28 is stored on the router 26 in conjunction with facilitating access to the shared information source 12 and the identifier 28 could be stored before or after discovery of the data loss. For example, the identifier 28 could be an Internet Protocol (IP) address of the UE 14a, a login identifier associated with a user of the UE 14a, or an email address associated with a user of the UE 14a. In this regard, network routers can be configured to collect IP addresses of network packets in memory as a file and/or log. For example, the Series 1841, 2800 and 3800 routers from Cisco Systems, Inc., of San Jose, Calif., support IP traffic capture. Other customer data such as HTTP (hypertext transfer protocol) headers, email addresses, and HTTP POST data (e.g., shopping cart data) may also be collected from routed packets. Moreover, identifiers of other users of the shared information source 12 may also be obtained from the router 26 and/or other components of the network.

In the illustrated example, the server 24 includes logic 30 to query the router 26 in response to detecting the data loss with respect to the shared information source 12, and receive the identifier 28 associated with the UE 14a from the router 26. The query might involve transmitting the identity of the server 24 and/or shared information source 12 to the network 16 and requesting information from any network component having data involving communications to or from the server 24 and/or shared information source 12. Alternatively, the router 26 could be configured to "push" the identifier 28 to the server 24 on a periodic or other basis. Upon receiving the identifier 28 of the UE 14a (and/or its associated user), from the router 26, the illustrated logic 30 uses data associated with the user/UE 14a to identify one or more additional users of the shared information source 12 such as users of UE 14b and UE 14c.

In particular, the logic 30 on the server 24 may also communicate with logic 32 resident on the UE 14a to obtain identifiers (e.g., IP addresses, login identifiers, email addresses, etc.) associated with the UE 14b and UE 14c. For example, the logic 32 might request a copy of an address book stored on the UE 14a from the logic 32, wherein the address book identifies the additional users. Moreover, the logic 30 could identify the additional users associated with the UE 14b and 14c based on the content 18 itself. In the case of an email database, the content 18 may include individual emails, wherein the logic 30 can parse through the individual emails to identify the email addresses of other senders and/or recipients. Once the additional users and/or their UE 14b, 14c are identified, the content 20, 22 may be retrieved from the UE 14b, 14c, respectively. The content 20, 22 and the additional users of such content 20, 22 in turn can provide a mechanism for identifying and contacting other users of the shared information source 12. The illustrated approach may therefore be considered a unique "bootstrapping" technique in the sense that data associated with a single user can be used to obtain source content from other users. Additionally, the illustrated approach could be used for other users that are initially identified via components of the network 16, which may result in multiple "fan out" nodes that provide recovery data, are distributed and may even be unrelated to one another.

FIG. 2 shows a method 34 of recovering a shared information source. The method 34 may be implemented in logic 30 (FIG. 1) associated with an information source such as a database or web site. Processing block 36 provides for detecting a data loss with respect to the shared information source. As already noted, the data loss could be the result of a variety of conditions such as a system failure, disk failure, or even human error. Detection of the data loss can trigger a number of activities designed to facilitate recovery of the shared information source. For example, prevention of all non-recovery related source activity could be instituted as well as a continuing instantaneous count of the number of documents, files and/or database rows and information source size for verification purposes. This information may be stored separately from the shared information source. In addition, the data loss may trigger a backup of the usable portion (if any) of the information source in its current state in the event that recovery actions result in a further corruption of data.

Illustrated block 38 provides for identifying a first user of the shared information source in response to the data loss. As already noted, the identification of the first user may involve querying a network component and receiving an identifier of the first user from the network component. The identifier might include an IP address of a device associated with the first user, a login identifier associated with the first user, an email address associated with the first user, and so on. Block 38 may also involve obtaining content associated with the shared information source from a device/computer associated with the first user and/or identifiers of one or more additional users of the shared information source. The content retrieved from the first user's device can be analyzed to determine if it is the most recent available replica or partial copy of the shared information source. Indeed, block 38 may be repeated to identify multiple "first users", which can function as an array of distributed fan out nodes that might even be unrelated to one another.

The content and/or identifiers obtained from the first user's device are used to identify one or more additional users of the shared information source at illustrated block 40. Block 40 may also provide for obtaining content associated with the shared information source from devices/computers associated with the additional users as well as identifiers of one or more further users of the shared information source. Thus, block 40 could be performed iteratively until all known users of the shared information source are identified and their respective copies of the source content are retrieved. Illustrated block 42 recovers the shared information source based at least in part on data associated with the additional users. For example, the content retrieved from the additional users' devices may be used to reconstruct the shared information resource even though the additional users' identities (or their devices) were not retrievable from the network component(s). Moreover, the recovered data can be updated to reflect the latest copies of all content, including deletions that occurred during the outage.

Block 42 may also provide for conducting a comparison between the reconstructed shared information source and a previous shared information source (e.g., most recent "pre-outage" copy), and generating one or more notifications based on the comparison. For example, the new size of the information source and count of the number of documents, files and/or database rows can be compared to the size and count of the pre-outage copy of the information source. If the size and count match, recovery may be deemed complete. If the new count and/or size are less than that of the pre-outage copy, a notification of potential data loss might be generated. If, on the other hand, the new count and/or size are greater than that of the pre-outage copy, the notification could indicate that some deletion actions may not have been recorded. If recovery activities are complete, information source activity can be reactivated and the users may be so notified.

Turning now to FIG. 3, a method 44 of processing a recovery request is shown. The method 44 may be implemented in logic 32 (FIG. 1) of a user device used to access a shared information source such as a database or web site. Illustrated processing block 46 provides for accessing the shared information source. Thus, block 46 could involve editing a relational database, sending or receiving an email message, navigating a web site, and so on. Moreover, block 46 may involve storing portions of or all of the shared information source locally on the user device. A recovery request associated with the shared information source may be received at block 48. The recovery request may be generated by logic 30 (FIG. 1) associated with the shared information source, as already discussed. Illustrated block 50 provides for transmitting data associated with one or more additional users of the shared information source in response to the recovery request. In particular, the transmitted data might include content corresponding to the shared information source, wherein the content identifies the additional users. The transmitted data may also include identifiers (e.g., IP addresses, login identifiers, email addresses) of the additional users. Block 50 may also provide for prompting a user of the local device for permission to transmit the data associated with the additional users.

The above techniques may therefore be used to recover a wide variety of shared information sources without the assistance of logs or user lists. Moreover, the techniques may not require administrators to make backup copies of information source content, however if backup content information is available it can be used. Accordingly, backup related storage capacity requirements, and overall system cost and/or complexity can be reduced.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
    querying a network component in response to detection of a data loss with respect to a shared information source;
    receiving, at a component that is co-located with the shared information source and manages recovery of the shared information source, an identifier of a first user of the shared information source from the network component, wherein the identifier includes at least one of an Internet Protocol address, a login identifier, and an email address associated with the first user, wherein the first user provides data to the component in response to being identified to allow the component to determine whether one or more other users known to the first user also use the shared information source;
    identifying, at the component, one or more additional users of the shared information source based on analyzing, at the component, the data from the first user, wherein the one or more additional users each provide data to the component in response to being identified to allow the component to determine whether one or more other users known to the one or more additional users also use the shared information source;
    identifying, at the component, one or more further additional users of the shared information source based on analyzing, at the component, the data from the one or more additional users, wherein the one or more further additional users each provide data to the component in response to being identified to allow the component to determine whether one or more other users known to the one or more further additional users also use the shared information source;
    reconstructing the shared information source based at least in part on the data from one or more of the first user, the one or more additional users, and the one or more further additional users;
    conducting a comparison between the reconstructed shared information source and a previous shared information source; and
    generating a notification based on the comparison.

2. The method of claim 1, wherein identifying the one or more additional users includes obtaining identifiers of the one or more additional users from a computer associated with the first user.

3. A computer implemented method comprising:
    identifying, at a component that is co-located with a shared information source and manages recovery of the shared information source, a first user of the shared information source in response to detection of a data loss with respect to the shared information source, wherein the first user provides data to the component in response to being identified to allow the component to determine whether one or more other users known to the first user also use the shared information source;
    identifying, at the component, one or more additional users of the shared information source based on analyzing, at the component, the data from the first user, wherein the one or more additional users are each provide data to the component in response to being identified to allow the component to determine whether one or more other users known to the one or more additional users also use the shared information source;
    identifying, at the component, one or more further additional users of the shared information source based on analyzing, at the component, the data from the one or more additional users, wherein the one or more further additional users each provide data to the component in response to being identified to allow the component to determine whether one or more other users known to the one or more further additional users also use the shared information source; and
    recovering the shared information source based at least in part on the data from one or more of the first user, the one or more additional users, and the one or more further additional users.

4. The method of claim 3, wherein identifying the first user includes:
    querying a network component; and
    receiving an identifier of the first user from the network component.

5. The method of claim 4, wherein the identifier includes at least one of an Internet Protocol address, a login identifier, and an email address associated with the first user.

6. The method of claim 3, wherein identifying the one or more additional users includes obtaining identifiers of the one or more additional users from a computer associated with the first user.

7. The method of claim 3, wherein recovering the shared information includes:
    reconstructing the shared information source based on the data from the one or more additional users and the one or more further additional users; and
    conducting a comparison between the reconstructed shared information source and a previous shared information source.

8. The method of claim 7, further including generating a notification based on the comparison.

9. The method of claim 3, further including:
contacting the first user to retrieve the data from the first user in response to detection of the data loss;
contacting the one or more additional users to retrieve the data from the one or more additional users in response to analyzing the data from the first user; and
contacting the one or more further additional users to retrieve the data from the one or more further additional users in response to analyzing the data from the one or more additional users.

10. The method of claim 9, wherein the data from the first user, the one or more additional users, and the one or more further additional users includes one or more of an address book and content that is used to recover the shared information source, and wherein the address book and the content are to be parsed by the component to determine whether one or more other users also use the shared information source and to identify the one or more additional users and the one or more further additional users.

11. A computer program product comprising:
a non-transitory computer readable storage medium; and
computer usable code stored on the non-transitory computer readable storage medium, where, if executed by a processor, the computer usable code causes a computer to:
identify, at a component that is co-located with a shared information source and manages recovery of the shared information source, a first user of a shared information source in response to detection of a data loss with respect to the shared information source, wherein the first user is to provide data to the component in response to being identified to allow the component to determine whether one or more other users known to the first user also use the shared information source;
identify, at the component, one or more additional users of the shared information source based on an analysis, at the component, of the data from the first user, wherein the one or more additional users are each to provide data to the component in response to being identified to allow the component to determine whether one or more other users known to the one or more additional users also use the shared information source;
identify, at the component, one or more further additional users of the shared information source based on an analysis, at the component, of the data from the one or more additional users, wherein the one or more further additional users are each to provide data to the component in response to being identified to allow the component to determine whether one or more other users known to the one or more further additional users also use the shared information source;
recover the shared information source based at least in part on the data from one or more of the first user, the one or more additional users, and the one or more further additional users.

12. The computer program product of claim 11, wherein the computer usable code causes a computer to:
query a network component; and
receive an identifier of the first user from the network component.

13. The computer program product of claim 12, wherein the identifier is to include at least one of an Internet Protocol address, a login identifier, and an email address associated with the first user.

14. The computer program product of claim 11, wherein the computer usable code causes a computer to obtain identifiers of the one or more additional users from a computer associated with the first user.

15. The computer program product of claim 11, wherein the computer usable code causes a computer to:
reconstruct the shared information source based on the data from the one or more additional users and the one or more further additional users; and
conduct a comparison between the reconstructed shared information source and a previous shared information source.

16. The computer program product of claim 15, wherein the computer usable code causes a computer to generate a notification based on the comparison.

17. A computer implemented method comprising:
receiving, from a component that is co-located with a shared information source and manages recovery of the shared information source, a first recovery request associated with the shared information source at a first user of the shared information source, wherein the first recovery request is received in response to a detection, at the component, of a data loss with respect to the shared information source; and
transmitting data associated with the first user from the first user to the component in response to the first recovery request to allow the component to determine whether one or more other users known to the first user also use the shared information source, wherein the data transmitted by the first user is analyzed, at the component, to identify, at the component, the one or more additional users of the shared information source, wherein each of the one or more additional users receive a second recovery request from the component and transmit data to the component in response to the second recovery request to allow the component to determine whether one or more other users known to the one or more additional users also use the shared information source, wherein the data transmitted by the one or more additional users is analyzed, at the component, to identify, at the component, one or more further additional users of the shared information source, and wherein each of the one or more further additional users receive a third recovery request from the component and transmit data to the component in response to the third recovery request to allow the component to determine whether one or more other users known to the one or more further additional users also use the shared information source.

18. The method of claim 17, wherein transmitting the data associated with one or more additional users includes transmitting identifiers of the one or more additional users.

19. The method of claim 17, further including prompting the first user for permission to transmit the data associated with the one or more additional users.

20. A computer program product comprising:
a non-transitory computer readable storage medium; and
computer usable code stored on the non-transitory computer readable storage medium, where, if executed by a processor, the computer usable code causes a computer to:
receive, from a component that is co-located with a shared information source and manages recovery of the shared information source, a first recovery request associated with the shared information source at a first user of the shared information source, wherein the first recovery request is to be received in response to a detection, at the component, of a data loss with respect to the shared information source; and transmit data associated with the first user from the first user to the component in response to the first recovery request to allow the component to determine whether one or more other users known to the first user also use the shared information source, wherein the data to be transmitted by the first user is to be analyzed, at the component, to identify, at the component, the one or more additional users of the shared information source, wherein each of the one or more additional users are to receive a second recovery request from the component and are to transmit data to the component in response to the second recovery request to allow the component to determine whether one or more other users known to the one or more additional users also use the shared information source, wherein the data transmitted by the one or more additional users is to be analyzed, at the component, to identify, at the component, one or more further additional users of the shared information source, and wherein each of the one or more further additional users are to receive a third recovery request from the component and are to transmit data to the component in response to the third recovery request to allow the component to determine whether one or more other users known to the one or more further additional users also use the shared information source.

21. The computer program product of claim 20, wherein the computer usable code causes a computer to transmit identifiers of the one or more additional users.

22. The computer program product of claim 20, wherein the computer usable code causes a computer to prompt a first user for permission to transmit the data associated with the one or more additional users.

* * * * *